US006622072B2

United States Patent
Asumi et al.

(10) Patent No.: US 6,622,072 B2
(45) Date of Patent: Sep. 16, 2003

(54) BELT REPLACEMENT TIMING ANNUNCIATOR FOR BELT-TYPE AUTOMATIC TRANSMISSIONS

(75) Inventors: Michio Asumi, Saitama (JP); Hirokazu Komuro, Saitama (JP); Yuuji Ono, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/045,154

(22) Filed: Jan. 15, 2002

(65) Prior Publication Data

US 2002/0093423 A1 Jul. 18, 2002

(30) Foreign Application Priority Data

Jan. 15, 2001 (JP) .................................. 2001-007013

(51) Int. Cl.[7] .............................................. G01M 17/00
(52) U.S. Cl. ............................ 701/30; 701/51; 477/44; 477/46; 474/64; 474/100
(58) Field of Search ....................... 701/30, 51, 52, 701/65, 66; 477/44, 46, 75; 475/294, 298, 269; 474/8, 64, 69, 73, 100, 101

(56) References Cited

U.S. PATENT DOCUMENTS 4,784,017 A * 11/1988 Okada et al. ................. 475/6
5,226,854 A *  7/1993 Hauser ......................... 474/83

FOREIGN PATENT DOCUMENTS

JP          64-53558        4/1989

* cited by examiner

Primary Examiner—Gertrude Arthur
(74) Attorney, Agent, or Firm—Birch, Stewart, Kolasch & Birch, LLP (57) ABSTRACT

To improve the maintainability of a vehicle by properly identifying a worn endless belt in a belt-type automatic transmission and informing a driver of the proper belt replacement interval. The belt replacement timing annunciator relies upon the radii of the endless belt wound around a drive pulley and around a driven pulley that vary to produce shifting change gear ratios. Various operating conditions and the actual change gear ratio for the specific operating condition are detected, and a comparison between a reference change gear ratio and the actual change gear ratio is made to determine if belt replacement is necessary. A timer device provides a predetermined observation interval for avoiding erroneous readings and a display is also provided for indicating the necessity of belt replacement.

16 Claims, 6 Drawing Sheets

BELT REPLACEMENT TIMING ANNUNCIATOR FOR BELT-TYPE AUTOMATIC TRANSMISSIONS

CROSS-REFERENCES TO RELATED APPLICATIONS

This nonprovisional application claims priority under 35 U.S.C. §119(a) on Patent Application No. 2001-007013 filed in Japan on Jan. 15, 2001, the entirety of which is herein incorporated by reference.

BACKGROUND OF THE INVENTION

1. Field of the Invention

The present invention relates to a belt replacement timing annunciator, and more particularly to a belt replacement timing annunciator for informing the driver of a vehicle of the necessity of replacement of the endless belt in an automatic, belt-type transmission.

2. Description of the Background Art

Since the endless belt in a belt-type automatic transmission mounted on a vehicle of the background art is worn away by contact with a pulley during operation, the endless belt is indicated as requiring replacement when the integrated mileage of the vehicle exceeds a predetermined reference value in the service manual. A belt-type automatic transmission in which the change gear ratio of the automatic transmission is displayed on the meter panel is described in Japanese Patent Laid-Open No.53558/1989. In the stepless, variable power transmission system described in this patent publication, a potentiometer is provided for detecting the movement zone of a movable pulley for a drive pulley on which an endless belt is routed. The output of the potentiometer is converted into the change gear ratio, and the change gear ratio is displayed on the change gear ratio display provided on the meter panel.

Since the actual extent of wear of the endless belt varies depending on the vehicle operating conditions, and therefore differs significantly from the timing of belt replacement based on the integrated mileage indicated in the service manual, a system that can properly indicate the necessity of belt replacement based on the actual wear of the endless belt would be desirable in the background art.

The technology in the related art disclosed in the aforementioned patent publication is a system that simply displays the actual change gear ratio of the stepless, variable power transmission system, and the timing of replacement of the endless belt in relation to the gear ratio is not considered.

SUMMARY OF THE INVENTION

The present invention overcomes the shortcomings associated with the background art and achieves other advantages not realized by the background art.

An object of the present invention is to improve the maintainability of a vehicle by keeping track of the wear conditions of an endless belt in a belt-type, automatic transmission system.

A further object of the present invention is to accurately and clearly inform the driver of the proper timing for replacement of the belt in the aforementioned transmission system.

These and other objects are accomplished by a belt replacement timing annunciator for an automatic transmission mounted on a vehicle provided with an endless belt routed between a drive pulley connected to an output shaft of an engine and a driven pulley connected to an axle of a driving wheel, wherein a change gear ratio is shifted by changing radii of the endless belt according to operating conditions of the vehicle, the annunciator comprising means for detecting specific operating conditions of the vehicle; means for detecting an actual change gear ratio of the automatic transmission; means for determining that the endless belt requires replacement, wherein the means for determining outputs a determination if the actual change gear ratio exceeds a predetermined reference change gear ratio for the specific operating condition; and means for displaying the result of the determination of the means for determining.

These and other objects are further accomplished by a belt replacement timing annunciator for an automatic transmission mounted on a vehicle provided with an endless belt routed between a drive pulley connected to an output shaft of an engine and a driven pulley connected to an axle of a driving wheel, wherein a change gear ratio is shifted by changing radii of the endless belt according to operating conditions of the vehicle, the annunciator comprising an electronic control unit; a pair of revolution sensors providing a number of output shaft revolutions signals and a vehicle velocity signal; a throttle valve opening sensor for recording a degree of throttle valve opening signal; a microcomputer, the microcomputer processing the signals from the sensors, recording an integrated mileage value L and calculating an actual change gear ratio and comparing the actual change gear ratio to a predetermined reference change gear ratio; an LED display for indicating a belt replacement signal when the actual change gear ratio is abnormal to the predetermined reference change gear ratio; and a resetting device for clearing a belt replacement signal based upon an operator input.

Therefore, in contrast to the related art described above, the wear condition of the endless belt reflecting various operating conditions of the vehicle, which were heretofore difficult to identify from the integrated mileage alone, can be identified adequately and properly with the present invention. Accordingly, the endless belt can be replaced at proper intervals and the maintainability of the vehicle is improved.

The present invention prevents an erroneous determination of the timing of belt replacement based on the variable change gear ratios calculated during variations in operating condition of the vehicle. Accordingly, a reliable determination of belt replacement intervals is realized.

According to the an aspect of the invention, the reference change gear ratio is determined based on the minimum predetermined change gear ratio that is determined during operating conditions in which the effect on the predetermined change gear ratio is smaller than the operating conditions at other predetermined change gear ratios, and the actual change gear ratio is detected in that reliable operating condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
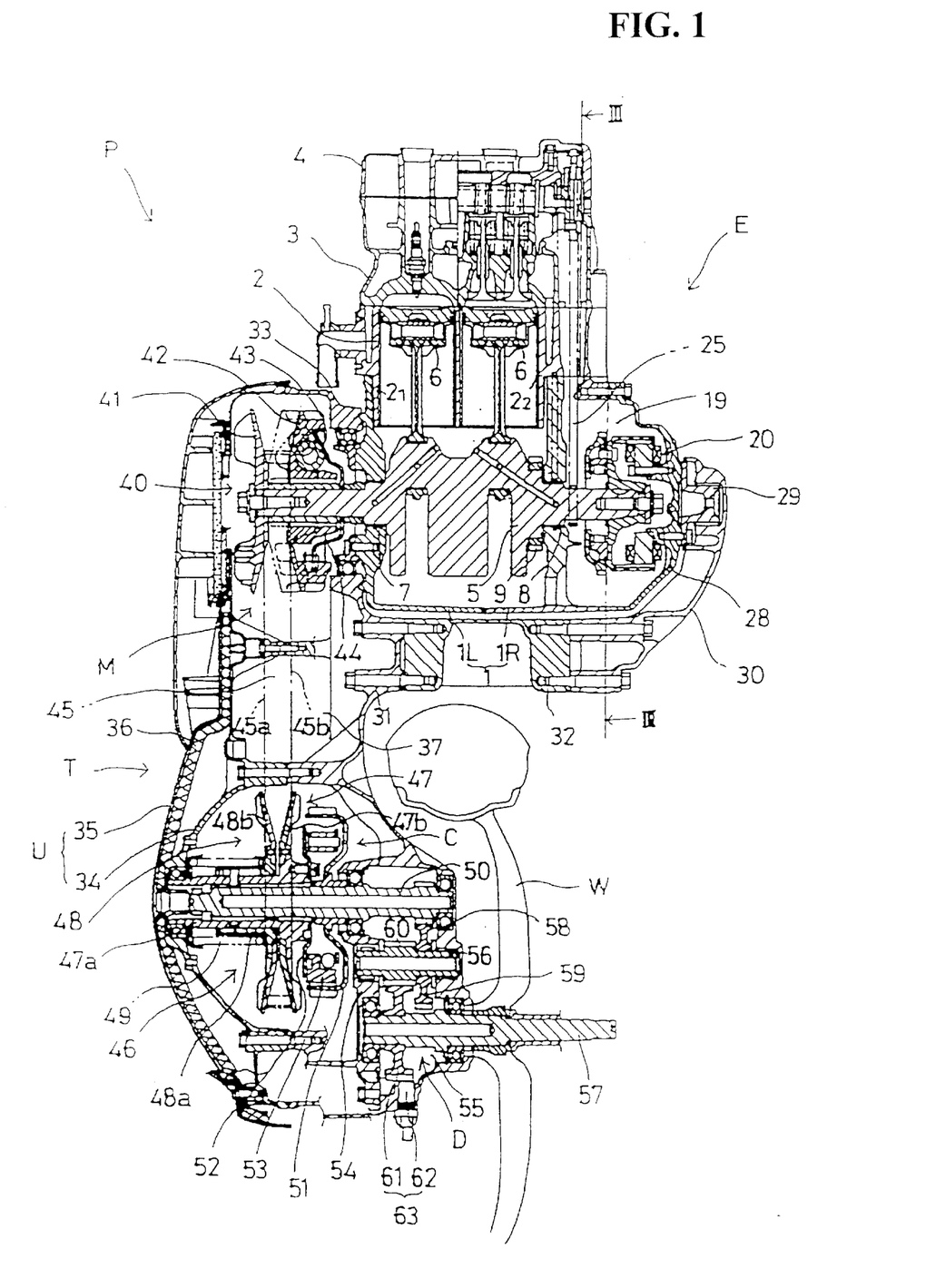
FIG. 1 is a plan view in cross section of a power unit having an internal combustion engine and a belt-type automatic transmission according to an embodiment of the present invention.
Figure 2:
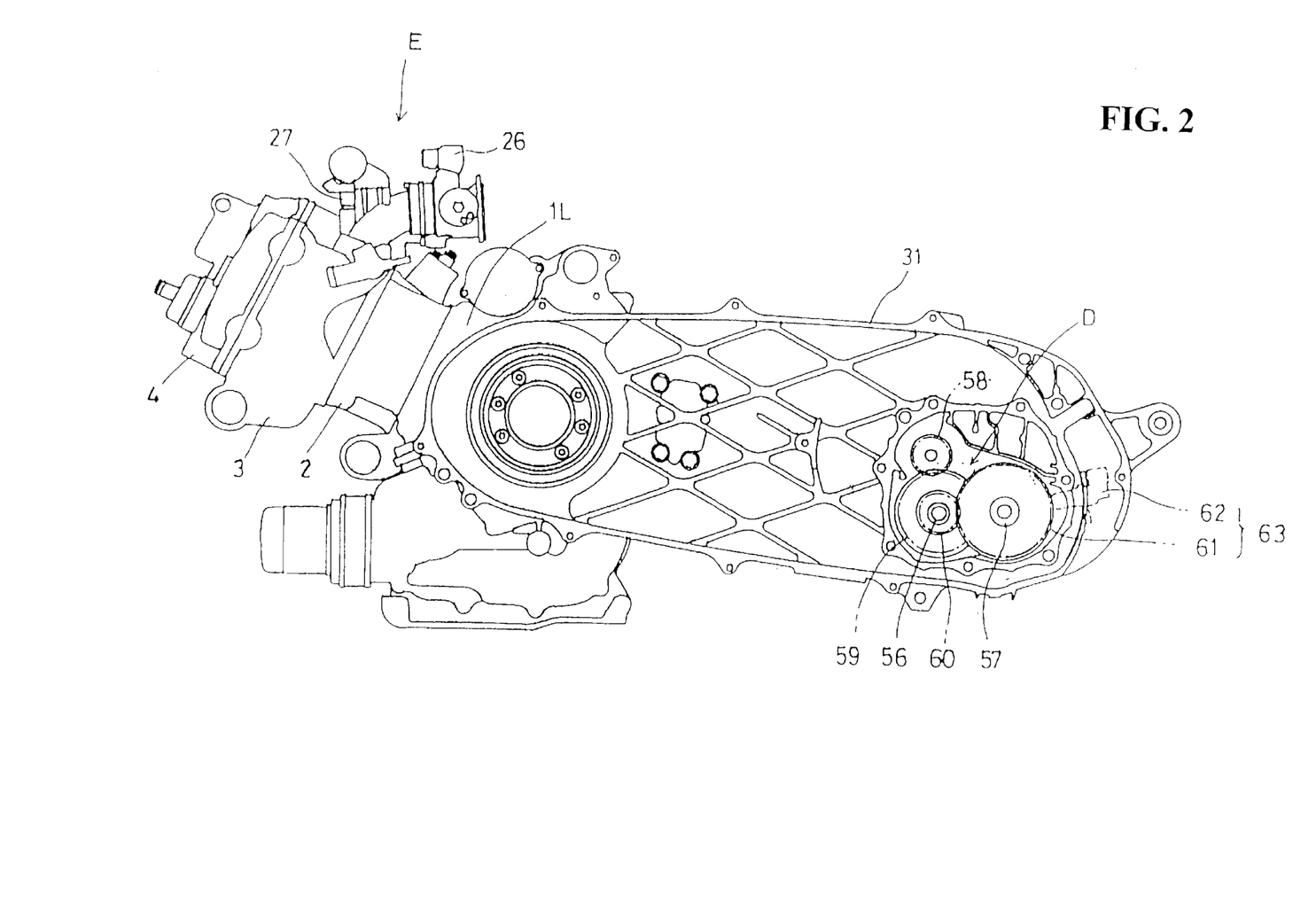
FIG. 2 is a side view of the power unit of FIG. 1 viewed with the belt-type automatic transmission and a cover unit removed.
Figure 3:
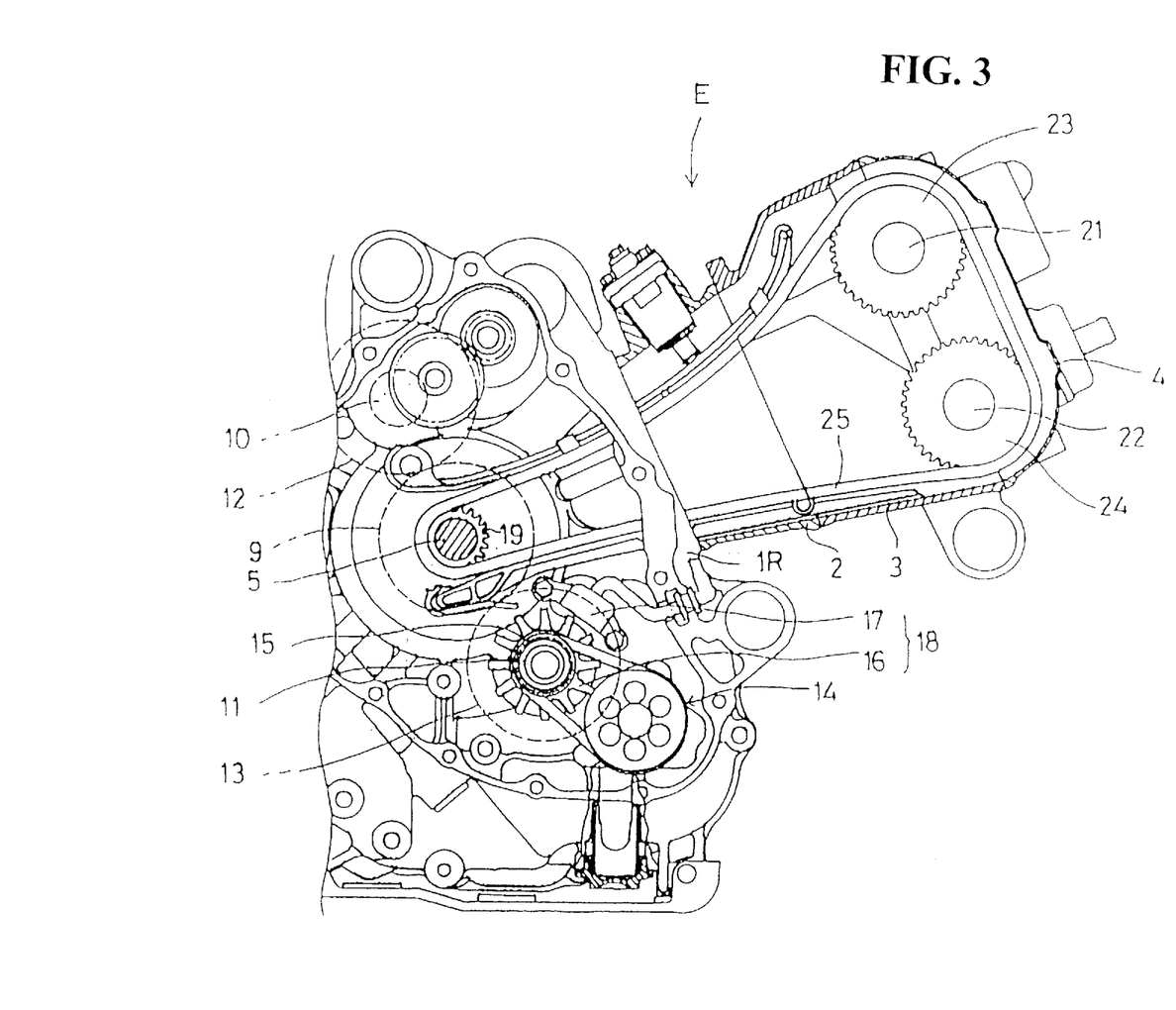
FIG. 3 is a cross sectional view taken along line III—III of FIG. 1.
Figure 4:
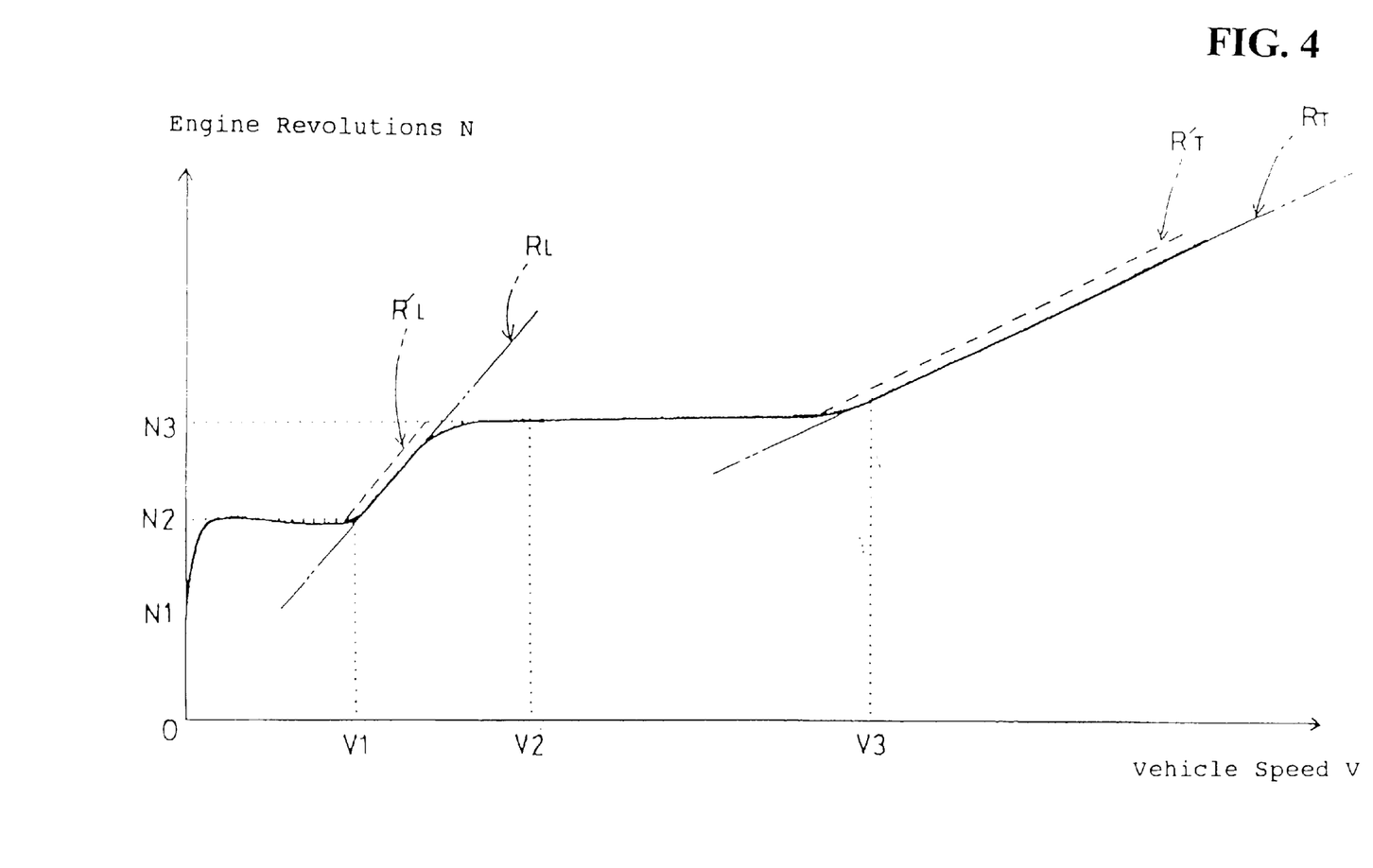
FIG. 4 is a graphical view showing transmission properties of the belt-type automatic transmission shown in FIG. 1.
Figure 5:
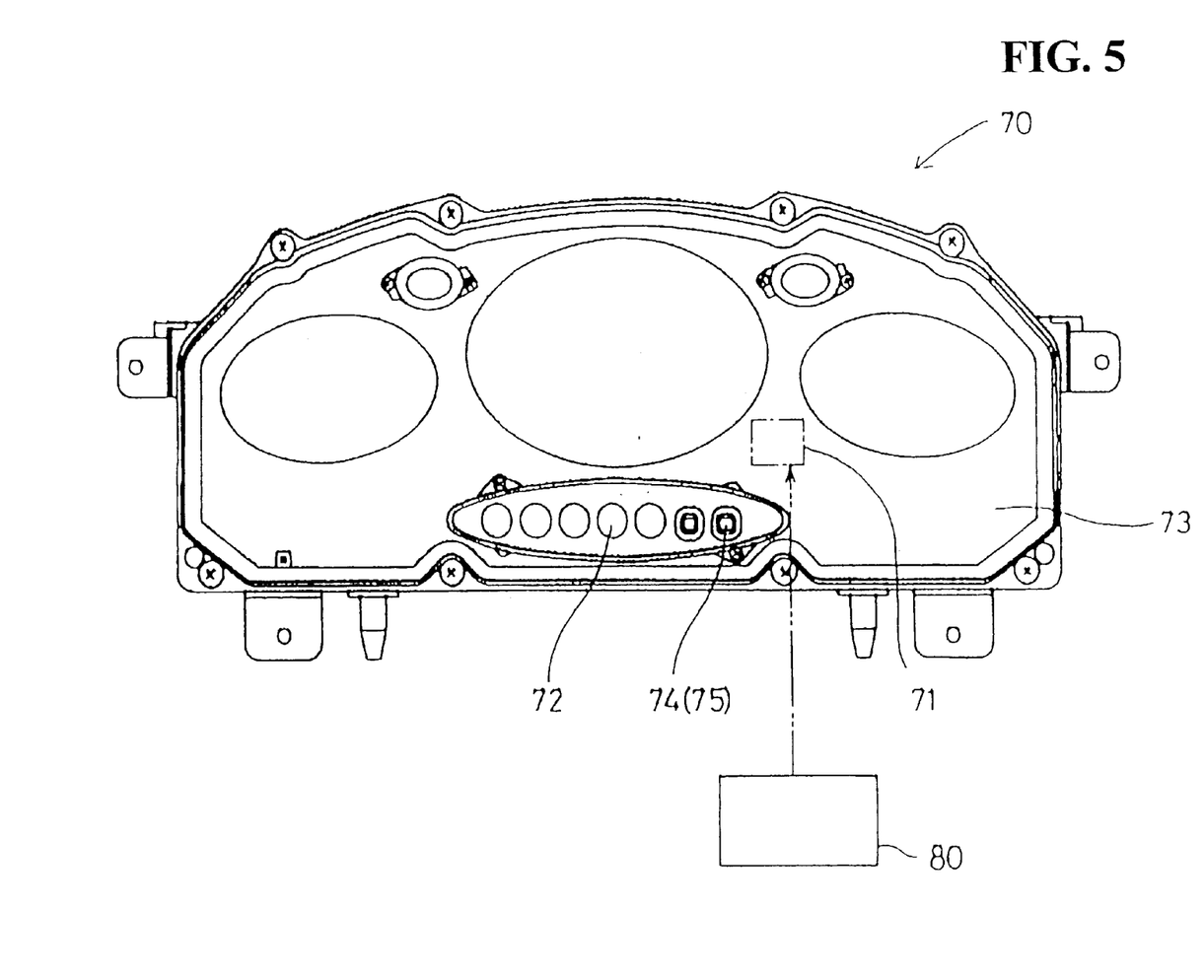
FIG. 5 is a frontal view of an instrument panel for a motorcycle on which the power unit shown in FIG. 1 is to be mounted according to an embodiment of the present invention.
Figure 6:
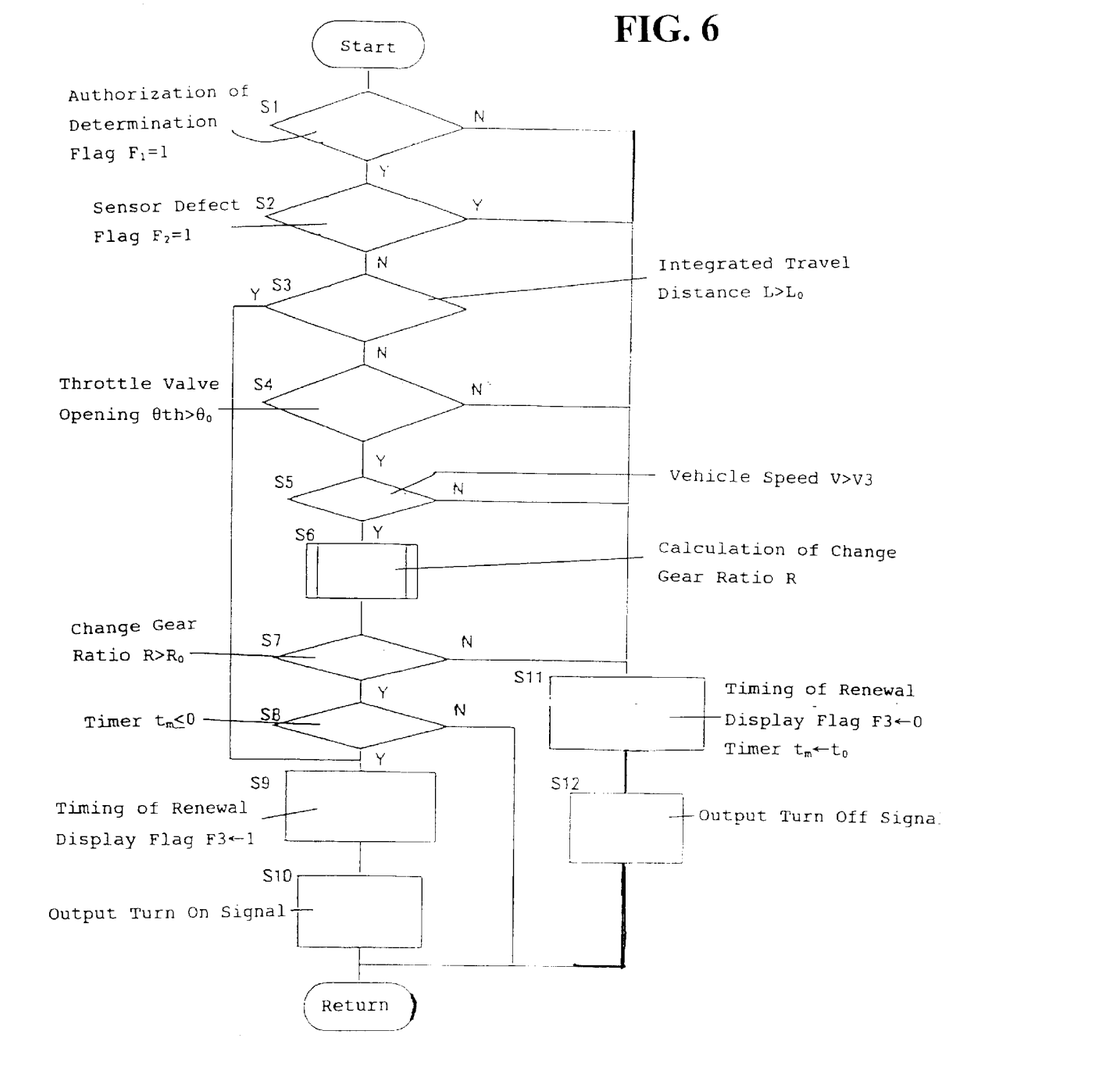
FIG. 6 is a flow chart of a belt replacement timing determination routine of the belt replacement timing annunciator according to an embodiment of the present invention.

The present invention will hereinafter be described with reference to the accompanying drawings. FIG. 1 is a plan view in cross section of a power unit having an internal combustion engine and a belt-type automatic transmission according to an embodiment of the present invention. FIG. 2 is a side view of the power unit of FIG. 1 viewed with the belt-type automatic transmission and a cover unit removed. FIG. 3 is a cross sectional view taken along line III—III of FIG. 1. FIG. 4 is a graphical view showing transmission properties of the belt-type automatic transmission shown in FIG. 1. FIG. 5 is a frontal view of an instrument panel for a motorcycle on which the power unit shown in FIG. 1 is to be mounted according to an embodiment of the present invention. FIG. 6 is a flow chart of a belt replacement timing determination routine of the belt replacement timing annunciator according to an embodiment of the present invention.

Referring to FIG. 1 and FIG. 2, a power unit P including an internal combustion engine E and a transmission system T including a belt-type automatic transmission M, a starting clutch C, and a decelerator D formed into a single unit is mounted on the motorcycle. Although not shown in these figures, the power unit is aligned horizontally with the laterally oriented crankshaft 5.

The internal combustion engine E includes an engine body including a cylinder bock 2, cylinder head 3, and a head cover 4 superimposed in sequence on the crankcase 1 that can be divided into left and right halves. These components are formed into one unit by integrating all these four components together, and the unit is placed on the vehicle body in a forwardly tilted state in which the cylinders 21, 22 face toward an upper, front portion of the vehicle body.

Hereinafter, the terms "front, rear, left and right" are indicative of the "front, rear, left and right" with respect to the vehicle body as viewed from the perspective of a vehicle operator.

The transmission system T disposed on the left side of the vehicle body is, as will be described hereinafter, supported so as to be capable of swinging vertically with respect to the internal combustion engine E. The transmission T is supported by the crankcase 1 with the axis of rotation of the crankshaft 5 as a center of swinging motion. The transmission T is rotatably supported at the rear end portion thereof by the rear portion of the vehicle body via a shock absorber. A rear wheel W, which is a drive wheel of the vehicle, is supported at the rear portion of the transmission system T with a shaft.

The internal combustion engine E is a two-cylinder, four-cycle internal combustion engine, in which reciprocating movements of the pistons 6 slidably fitted into two cylinders 21, 22 of the cylinder block 2 are transmitted via a connecting rod to the crankshaft 5. The crankshaft 5 is an output shaft rotatably supported by the crankcase 1 via a pair of left and right main bearings 7, 8.

The crankshaft 5 is provided with a drive gear 9 at a position adjacent to the right main bearing 8 on the left side thereof, and as shown in FIG. 3. The drive gear 9 engages with the driven gears 12, 13 provided on a pair of balancer shafts 10, 11 disposed above and below the crankshaft 5, so that both of the balancer shafts 10, 11 rotate in reverse directions with respect to each other at the same speed as the crankshaft 5.

A pump driving pulley 15 for driving an oil pump 14 and a pulsar rotor 16 having a plurality of projections on the outer periphery thereof are connected to the right end portion of one of the balancer shafts 11. A pick-up 17 is disposed at a position radially outward of the pulsar rotor 16 and opposed to the projections, so that the pulsar rotor 16 and the pick-up 17 constitute the revolution sensor 18 for detecting the number of revolution of the crankshaft 5, e.g. the number of engine revolutions N via the balancer shaft 11.

In addition, a drive sprocket 19 is provided on the right end portion of the crankshaft 5 projecting rightward of the right main bearing 8 and a AC generator 20 is provided on the right thereof. A drive pulley 40 is provided for the automatic transmission M at the left end portion of the crankshaft 5 projecting leftward of the left main bearing 7. A timing chain 25 is routed around the drive sprocket 19, and cam sprockets 23, 24 interlocked with the intake camshaft 21 and an exhaust camshaft 22 (See FIG. 3) that are components of the motion valve mechanism provided on the cylinder head 3 respectively. Two intake valves and two exhaust valves provided correspondingly to the cylinders 21, 22 are operated at prescribed opening and closing intervals by the timing action of cams respectively formed on both of the camshafts 23, 24 rotated by the power of the crankshaft 5 transmitted via the timing chain 25.

Then, fuel injected from the fuel injection valve 27 to the intake passage by the amount of injection determined based on a variety of detected signals. The detected signals are from the revolution sensor 18, an opening sensor 26 for detecting the opening of the throttle valve, a pressure sensor for detecting the pressure of the intake passage, a temperature sensor for detecting the temperature of cooling water, and the like to be supplied to the electronic control unit (ECU) 80 (See FIG. 5) of the fuel injection control unit. The fuel is mixed with air sucked through the throttle valve and sucked into the combustion chamber through the intake valve, and then ignited by the ignition plug and burned. The combustion gases drive the piston 6 by its combustion pressure and is discharged through the exhaust valve to the exhaust passage.

A right case 30 is rotatably supported on the supporting shaft 29 fixed to the generator cover 28 joined to the right crankcase 1R. The right case 30 is joined to the connecting member 32 disposed along the rear surface of the right crankcase 1R, and a left case 31 is joined to the connecting member 32. Accordingly, the right case 30 and the left case 31 are integrally joined via the connecting member 32. An annular supporting member 33 connected to the left wall of the left crankcase 1L so as to surround the crankshaft 5 rotatably supports the left case 31. The left case 31 opens toward the left side, and the opened portion is covered by the cover unit U of dual structure having an inner cover 34 and an outer cover 35. A sound absorption member 36 adheres to an inner surface of the outer cover 35.

The automatic transmission M, the starting clutch C, and the decelerator D for transmitting the power of the crankshaft 5 to the rear wheel W are stored in the transmission chamber 37 constructed of the left case 31 and the cover unit U. The transmission system T is capable of swinging freely with respect to the crankcase 1.

The automatic transmission M includes a drive pulley 40 of variable diameter, a driven pulley 46 of variable diameter, and an endless belt 45 formed for example of a V-belt routed around both pulleys 40, 46. The drive pulley 40 includes a fixed pulley strip 41 fixed so as not to move in the axial direction and in the direction of rotation with respect to the crankshaft 5. The fixed pulley strip 40 also has a conical surface with which one side surface 45a of the endless belt 45 is brought into contact.

A movable pulley strip 42 is joined so as to be capable of moving in the axial direction but not in the direction of rotation with respect to the crankshaft 5 and has a conical surface with which the other side surface 45b of the endless belt 45 is brought into contact. The movable pulley strip 42 is provided with a plurality of weight rollers 43 for moving the movable pulley strip 42 in the radial direction along an axis of the back surface of the movable pulley strip 42 by the action of a centrifugal force generated by the rotation of the drive pulley 40. A lamp plate 44 having guiding surfaces for guiding the radial movement of the weight roller 43 as a driving mechanism for the movable pulley strip 42 is also provided.

The driven pulley 46 is provided on the left portion of the driven shaft 50 oriented laterally with respect to the motorcycle. The right end portion of the driven shaft 50 is rotatably supported by the left case 31, and the intermediate portion thereof is rotatably supported by a mission cover 54, which will be described later. In addition, the driven pulley 46 comprises a fixed pulley strip 47 that is fixed with respect to the driven shaft 50 but rotatable, and a movable pulley strip 48 that is movable with respect to the fixed pulley strip 47 in the axial direction. The driven pulley 46 is also provided with a spring 49 for urging the movable pulley strip 48 toward the fixed pulley strip 47 as a driving mechanism for the movable pulley strip 48.

The fixed pulley strip 47 includes an inner sleeve 47a rotatably supported on the outer periphery of the driven shaft 50, and a conical plate 47b fixed to the inner sleeve 47a and having a conical surface with which the other side surface 45b of the endless belt 45 is brought into contact. The inner sleeve 47b is rotatably supported by the inner cover 34 at its left end portion.

The movable pulley strip 48 includes an outer sleeve 48a fitted on the outer periphery of the inner sleeve 47a so as to be capable of sliding in the axial direction, and a conical plate 48b fixed on the outer sleeve 48a and having a conical surface with which one side surface 45a of the endless belt 45 is brought into contact.

A starting clutch C comprising a centrifugal clutch is provided on the driven shaft 50 between the fixed pulley strip 47 and the mission cover 54 forming a mission chamber 55 for storing the decelerator D that will be described hereinafter. The starting clutch C includes a clutch outer 51 formed in the shape of a bowl and rotating integrally with the driven shaft 50, and a drive plate 52 disposed inside of the clutch outer 51 and rotating integrally with the fixed pulley strip 47.

When the driven pulley 46 rotates at the number of revolutions exceeding the predetermined number of revolutions for starting linkage, a plurality of clutch shoes 53 supported by the drive plate 52 so as to be capable of swinging motion swing radially outwardly by the action of a centrifugal force against a spring force of the clutch spring and abut against the inner peripheral surface of the clutch outer 51. The starting clutch C is then brought into a connected state and the rotation of the driven pulley 46 is transmitted to the driven shaft 50.

The driven shaft 50 is drivingly joined to the rear axle 57 on which the rear wheel W is mounted via the decelerator D having a speed reducing gear train. In the rear portion of the transmission chamber 37, a mission chamber 55 defined by the rear portion of the left case 31 and a mission cover 54 that is disposed between the rear portion of the left case 31 and the starting clutch C is provided.

The decelerator D stored in the mission chamber 55 includes a first gear 58 of small diameter provided on the right end portion of the driven shaft 50, a second gear 59 of a large diameter and a third gear 60 of a small diameter provided on the intermediate shaft 56 rotatably supported by the left case 31. A fourth gear 61 of relatively large diameter is provided on the rear axle 57 and is rotatably supported by the left case 31 and a mission cover 54. The first gear 58 engages the second gear 59, and the third gear 60 engages the fourth gear 61, and thus the rotation of the driven shaft 50 is decelerated to the second gear and transmitted to the rear axle 57.

The left case 31 is provided with a pick-up 62 at a position radially facing toward the teeth of the fourth gear 61 mounted on the rear axle 57. The fourth gear 61 acting as a pulsar rotor and the pick-up 62 include a revolution sensor 63 for detecting the number of revolutions of the driven shaft 50, e.g. the number of revolutions of the driven pulley 46 in a state in which the starting clutch C is in a completely connected state via the rear axle 57 and the intermediate shaft 56. Since the revolution sensor 63 detects the number of revolutions after gear change is made by the automatic transmission M, it also serves as a vehicle velocity sensor for detecting the vehicle velocity V of the motorcycle.

Referring now to FIG. 4, a graph showing the transmission properties in a state in which a new endless belt 45, or an endless belt 45 that has little wear and has the same change gear ratio as that of the new endless belt is used in the transmission system T thus constructed. The change-gear action of the automatic transmission M will be described hereinafter. When the internal combustion engine E is operated and the number of engine revolutions N is not more than the first predetermined number of revolutions N1, the starting clutch is in the disconnected state and thus the motorcycle is in an immobilized state because the number of revolutions of the driven pulley 46 is not more than the number of revolutions for the starting linkage. At the drive pulley 40, a centrifugal force of the weight roller 43 is not large enough it can move the movable pulley strip 42 in the axial direction since the number of engine revolutions N is low. Accordingly, the movable pulley strip 42 is away from the fixed pulley strip 41, and the radius of the endless belt 45 wound thereon is minimized.

At the driven pulley 46, the movable pulley strip 48 urged by the spring 49 is close to the fixed pulley strip 47, and the radius of the endless belt 45 wound thereon is maximized. Therefore, the power of the crankshaft 5 is transmitted to the driven pulley 46 at the maximum change gear ratio RL.

When the throttle valve is gradually opened and the number of engine revolutions N slightly exceeds the first predetermined number of revolutions N1, the number of revolutions of the driven pulley 46 exceeds the number of revolutions for the starting linkage. The clutch shoe 53 swings by the action of centrifugal force and is brought into contact with the clutch outer 51. Consequently, the power of the crankshaft 5 is transmitted to the driven shaft 50 and then to the rear axle 57 via the decelerator D, and the motorcycle starts moving.

When the number of engine revolutions N further increases and reaches the second prescribed number of engine revolutions N2, the vehicle velocity V increases in a state where the start clutch C is at a half clutch position and in a state in which the number of engine revolutions N is almost constant at more or less the second predetermined number of revolutions N2. The start clutch C is completely linked with the vehicle velocity V being near the first vehicle velocity V1, and the power of the crankshaft 5 is transmitted to the driven shaft 50 at the maximum change gear ratio RL.

The power of the crankshaft 5 is shifted at this predetermined constant maximum change gear ratio RL and is transmitted to the driven shaft 50 in the operating state of the motorcycle corresponding to the low rotational region or the low vehicle velocity region. This power transmission continues until the number of engine revolutions N reaches the third predetermined number of revolutions N3 from the second predetermined number of revolutions N2 or until the vehicle velocity V reaches the second vehicle velocity V2. The engine power is then transmitted to the rear axle 57 via the decelerator D, so that the motorcycle travels at the vehicle velocity V in proportion with the number of engine revolutions N.

When the throttle valve is further opened and the number of engine revolutions N slightly exceeds the third predetermined number of revolutions N3, at the drive pulley 40, the movable pulley strip 42 is moved in the axial direction by the weight roller 43 that moves radially from the movable pulley strip 42 by the action of centrifugal force toward the fixed pulley strip 41. The radius of the endless belt 45 wound thereon gradually increases.

At the driven pulley 46, the movable pulley strip 48 moves in the axial direction away from the fixed pulley strip 47 while compressing the spring 49 against a spring force, and the radius of the endless belt 45 wound thereon gradually decreases. As a consequence, the change gear ratio is automatically changed in a state in which the number of engine revolutions N is almost constant at more or less the third predetermined number of revolutions N3, and the vehicle velocity V increases.

When the weight roller 43 abuts against the stopper provided on the back surface of the movable pulley strip 42 and the radial movement thereof is disturbed at the vehicle velocity V near the third vehicle velocity V3, the radius of the endless belt 45 wound around the drive pulley 40 is maximized, and the radius of the endless belt 45 wound around the driven pulley 46 is minimized. A constant minimum change gear ratio RT is then determined. At this time, the opening of the throttle valve is large, and the power of the crankshaft 5 is shifted at this minimum change gear ratio RT and is transmitted to the driven shaft 50 in the operating state of the motorcycle corresponding to the third predetermined number of revolutions N3. This operating state is the operating region in which the throttle valve is further opened to the fully opened state or to the high revolution region or the high vehicle velocity region is higher than the third vehicle velocity V3. The power is then transmitted to the rear axle 57 via the decelerator D, so that the motorcycle travels at the vehicle velocity V in proportion to the number of engine revolutions N.

When the endless belt 45 that comes into contact with the drive pulley 40 and the driven pulley 46 wears on both side surfaces 45a, 45b that are the areas coming into contact with both pulleys, and the width of the endless belt 45 gradually decreases as a result of long term use of the motorcycle, the actual change gear ratio increases. In other words, with the same number of engine revolutions N, when the width of the endless belt 45 decreases due to wear, the radius of the endless belt 45 wound around the drive pulley 40 that has a movable pulley strip 42 to be pressed by the weight roller 43 decreases in comparison with the state in which no wear has occurred.

At the driven pulley 46 having a movable pulley strip 48 on which a spring force of the spring 49 is exerted, the radius of the endless belt 45 wound thereon increases from the condition in which no wear has occurred. The actual change gear ratio increases gradually as wear progresses from the change gear ratio in the condition that the new endless belt 45 or the endless belt 45 with little wear is used. Therefore, even under the operating condition of the motorcycle in which the maximum change gear ratio RL and the minimum change gear ratio RT can be obtained, the change gear ratios will be the constant values R'L, R'T larger than those as shown by dotted lines in FIG. 4.

Therefore, a belt replacement timing annunciator for automatic transmissions M is provided on the motorcycle in order to keep track of the wear condition of the endless belt 45 by detecting the actual change gear ratio R of the automatic transmission M and simultaneously keeping track of the wear condition of the endless belt 45 from the integrated mileage L to visually inform the driver of the fact that the wear of the endless belt 45 progresses. Accordingly, the endless belt 45 is replaced at the right time.

The belt replacement timing annunciator includes a change gear detecting device for detecting the actual change gear ratio R, an operating condition detecting device for detecting the operating condition of the motorcycle, a determination device for determining a timing of replacement, and a display for informing the driver of the fact that the endless belt 45 is at a replacement interval based on the result of determination of the determination device.

The change gear ratio detecting device includes a revolution sensor 18 and a revolution sensor 63 both providing the number of revolutions. The actual change gear ratio R is calculated and detected based on the detected signals from the revolution sensors 18, 63. As seen from the change gear properties of the automatic transmitter M shown in FIG. 4, since the maximum change gear ratio RL and the minimum change gear ratio RT, which are constant stable change gear ratios in which the number of engine revolutions N and the vehicle velocity V are in direct proportion, can be obtained when the motorcycle is in a specific operating condition, it is preferable to detect the change gear ratio R in the operating condition in which the constant change gear ratio can be obtained in order to determine the wear condition of the endless belt 45 precisely from the actual change gear ratio R.

Therefore, based on the opening of the throttle valve detected by the opening sensor 26 and the vehicle velocity V detected by the revolution sensor 63 that also serves as a vehicle velocity sensor, the calculating means is used to calculate the change gear ratio R in the operating condition in which the minimum change gear ratio RT can be obtained. The reason is that the high rotation region or the high vehicle velocity region, which is the operating condition of the motorcycle predetermined as the minimum change gear ratio RT, are the operating conditions in which the effect on the change gear ratio resulting from variations in the operating conditions of the motorcycle is less than the operating conditions in which the maximum change gear ratio RL is determined.

Referring to FIG. 5, the instrument panel 70 of the motorcycle includes a microcomputer 71 for processing the signals from the various sensors, calculating the vehicle velocity V, the number of engine revolutions N, the integrated mileage L, and the like, and displaying them on the various meters. Among others, the function for calculating the integrated mileage L in the microcomputer 71 corresponds to the integrated mileage measuring means.

The instrument panel 70 is provided, e.g. as display means, with the display lamp 72 formed of a light-emitting diode that is turned on when the endless belt 45 is determined to be at a right timing to be replaced by the determination means for informing the driver of the fact that the endless belt 45 is ready to be replaced. Furthermore, a lens 73 of the instrument panel 70 is provided with a push-button switch 74 for setting the time of the day on the clock being integrated in the instrument panel 70.

Referring now to the flow chart of the belt replacement timing determination routine in FIG. 6, the operation of the belt replacement timing annunciator will be described hereinafter. A series of processes in this routine is repeatedly performed at intervals of predetermined time period by the electronic control unit 80 as control means.

In Step S1, whether the determination authorizing flag F1 for deciding the initiation of determination of the belt replacement timing is "1" or not is first determined. The determination authorizing flag F1 is set to "1" when a predetermined time period has passed after the ignition switch is turned ON and the internal combustion engine E is actuated. After a few seconds have passed, and when the predetermined time period have not passed, it is set to "0." When the predetermined time period has not passed, it goes to Step S11, where the replacement timing display flag F3 for showing that the endless belt 45 is at the right timing to be replaced is set to "0," and the timer tm is set to the predetermined time period to.

Subsequently, in Step S12, the extinction signal for turning OFF the display lamp 72 that indicates that the endless belt 45 is ready to be replaced is supplied, and the routine terminates. On the other hand, when the predetermined time period has passed, the routine proceeds to Step S2.

In Step S2, whether or not any failure occurred in both revolution sensors 18, 63 and/or the opening sensor 26 is then determined. When the sensor failure flag F2 is "1," and a failure occurred in any one of the sensors, the routine jumps to Step S11, S12. When the sensor failure flag F2 is "0," and no detectable failure has occurred in any sensor, the routine proceeds to Step S3.

In Step S3, whether of not the integrated mileage L measured by the integrated mileage measuring means exceeds the reference distance LO that requires replacement of the endless belt 45 is then determined. When the integrated mileage L is not more than the reference distance LO, it goes to Step S4. When the mileage L exceeds the reference distance LO, the routine process to Step S9 and the timing of replacement display flag F3 that indicates that the endless belt 45 is ready to be replaced is set to "1." Subsequently, in Step S10, the illuminating signal that illuminates the display lamp 72 is supplied, and this routine terminates.

In Steps S4 and S5, whether or not the operating condition of the motorcycle is the operating condition in which the change gear ratio is at the minimum change gear ratio RT is determined. In other words, in Step S4, whether or not the opening qTH of the throttle valve is larger than the predetermined opening qO, at which the throttle valve is highly opened, is then determined. When the degree of opening is larger than the predetermined opening qO, the routine procees to Step S5. Whether or not the vehicle velocity V is larger than the predetermined third vehicle velocity V3, which is a high vehicle velocity, is determined in Step S5. When the vehicle velocity V is higher than the third vehicle velocity V3, it goes to Step S6.

On the other hand, when the determination in Step S4 or Step S5 is No, the routine jumps to Step S11 in either case, and then to Step S12 to complete the routine. The functions in both steps S4, S5 that are carried out in the electronic control unit 80 correspond to the operating state detecting means for detecting the specific operating condition described above.

In Step S6, the proportion between the number of revolutions of the drive pulley 40 (the number of engine revolutions N) detected by the revolution sensor 18, and the number of revolution of the driven pulley 46 detected by the revolution sensor 63, that also serves as a vehicle velocity sensor are detected, and the actual change gear ratio R is calculated. Accordingly, the actual change gear ratio R is detected.

Therefore, the function carried out in the electronic control unit 80 in Step S6 corresponds to the calculating of the change gear ratio. Thereafter, it goes to Step S7 and the progression of the wear condition of the endless belt 45 is determined. Since the change gear ratio increases as wear progresses as described above, whether or not the change gear ratio R calculated in Step S6 is larger than the reference change gear ratio RO is determined. The reference change gear ratio RO is set to a value larger than the minimum change gear ratio RT by a predetermined value corresponding to the wear condition that requires replacement of the endless belt 45 with respect to the minimum change gear ratio RT obtained when the endless belt 45 is new and the same change gear ratio as that of the new endless belt 45 is obtained in the operating conditions described above. When the result of this determination is No, it is determined that the extent of wear is not as much as is required for replacement and thus it is not at the right timing to be replaced, and then it goes to Step S11 and S12.

On the other hand, when it is determined that the change gear ratio R is larger than the reference change gear ratio RO, the endless belt 45 is ready to be replaced. The result of the determination in Step S7 is Yes, and the routine proceeds to Step S8. In Step S8, the timer tm that is set to the prescribed time period starts counting down. When the time is up, the routine is terminated once, and the processes from Step S1 to Step S8 are carried out respectively in the next routine.

When the time being counted by the timer tm is up in Step S8, the routine proceeds to Step S9. The value "1" is set to the replacement timing display flag F3, which indicates that the endless belt 45 is ready to be replaced. In subsequent Step S10, a signal to illuminate the display lamp 72 is supplied, and the routine terminates. The reason why the timer tm is provided here is to prevent an erroneous determination of belt wear based on the change gear ratio R resulting from temporary variations in change gear ratio due to variations in operating condition or the like of the motorcycle. The timer tm enhances the reliability of determination of the proper replacement timing for the endless belt 45.

The functions carried out in the electronic control unit 80 in Steps S7, S8, S9, and S10 correspond to the first determination means for determining that the belt is at the right timing to be replaced based on the actual change gear ratio R. The functions carried out in the electronic control unit 80 in Steps S3, S9, and S10 correspond to the second determination means for determining that the belt is at a right timing to be replaced based on the integrated mileage L.

Here, data of the integrated mileage L and the timing of replacement display flag F3 set in the step S9 are both stored in the non-volatile memory of the microcomputer 71 provided on the instrument panel 70. Therefore, the timing of replacement display flag F3 and data of the integrated mileage L are not reset even when the battery to be mounted on the motorcycle is replaced. In addition, the data will not be deleted unless the reset operation that will be described hereinafter is made. As a consequence, when the timing of replacement display flag F3 is set to "1," the display lamp 72 is always illuminated as far as the ignition switch is in the ON state.

The resetting operation can be executed by turning the ignition switch from OFF to ON with the reset switch 75 that also serves as the pressing switch 74. By keeping the reset switch 75 pressed for a predetermined time period, for example, longer than several seconds, the replacement interval is reset. By performing this resetting operation, the timing of replacement display flag F3 and data of the integrated mileage L are reset, and the timing of replacement display flag F3 is set to "b 0" and the display lamp 72 is turned OFF.

Operations and effects of the belt replacement timing annunciator according to the aforementioned embodiments will now be described hereinafter.

When the actual change gear ratio R of the belt-type automatic transmission M is detected and the actual change gear ratio R exceeds the reference change gear ratio RO it is determined that wear of the endless belt 45 has occurred and the belt is ready to be replaced. The reference change gear ratio RO is preset to the value larger than the minimum change gear ratio RT by a prescribed value based on the minimum change gear ratio RT. The presecribed value is determined during the operating conditions in which the throttle valve is set to the minimum change gear ratio RT, which is a constant change gear ratio, is highly opened, and the number of engine revolutions N is in the high revolution region, or the vehicle velocity V is in the high vehicle velocity region.

As opposed to the systems of the related art, the wear condition of the endless belt 45 even during various operating modes of the vehicle, which heretofore has been difficult to identify from the integrated mileage L alone, can be correctly identified. Accordingly, the proper timing of belt replacement can be accurately determined and detected by the vehicle operator. In addition, since the result of determination is displayed on the display lamp 72, the driver is able to know that the belt is ready to be replaced by viewing the display lamp 72. The maintainability of the motorcycle and the endless belt 45 are desirably increased.

In addition, since the reference change gear ratio Ro is set based on the minimum change gear ratio RT that is determined in the high revolution region or the high vehicle velocity region in which the effect on the predetermined change gear ratio resulted from variations in the operating conditions of the motorcycle, and the actual change gear ratio R is detected in this operating state, more accurate change gear ratios can be detected and thus more reliable determination of the timing of belt replacement can be made.

In addition, since the moment when the first determination means determines that the belt is ready to be replaced is when the actual change gear ratio R exceeds the reference change gear ratio Ro continuously for the predetermined period of time t0, e.g. until the time period preset to the timer tm is up, the timing of belt replacement is prevented from being determined based on an erroneously calculated change gear ratio R due to temporary variations in change gear ratio resulted from variations in the operating conditions of the motorcycle and the like. Accordingly, a reliable determination of the right timing for belt replacement can be made.

Since the display lamp 72 that indicates that the belt is at the right timing to be replaced is turned on based on the result of either one of the determinations made by the first determination means for determining that the belt is at the right timing to be replaced based on the actual change gear ratio R or the second determination made by the second determination means for determining that the belt is at the right timing to be replaced based on the integrated mileage L, which is made earlier, a proper belt replacement interval may be determined according to the actual operating conditions, including the integrated mileage L of the motorcycle.

A display indicating that the belt is ready to be replaced appears on the common display lamp 72 irrespective of the fact that the determinations of the timing of replacement are made based on the different criterion such as the change gear ratio R and the integrated mileage L. Therefore, the driver can easily recognize a right timing of belt replacement and thus the maintainability is improved.

In addition, since the timing of replacement display flag F3 and data of integrated mileage L are stored in the non-volatile memory, they are not reset even when the battery is replaced. The display lamp 72 that was turned on once when the timing of replacement display flag F3 became "b 1" is always illuminated when the ignition switch is ON. Furthermore, as described hereinabove, since the reset operation of the timing of replacement display flag F3 and data of the integrated mileage L must be done by the driver fairly consciously, the illuminated display lamp 72 cannot be turned off easily, and the driver is able to notice the fact that the belt is ready to be replaced.

Since the actual change gear ratio R can be detected by the use of the revolution sensor 18 for detecting the number of engine revolutions N to be supplied to the electronic control unit 80 for controlling the amount of fuel injection and the revolution sensor 63 that also serves as a vehicle velocity sensor, it is not necessary to provide a change gear ratio detecting means separately. The number of required components may be reduced and the maintenance/assembly costs may be eliminated/reduced.

An embodiment in which the structure of a part of the embodiment described above is modified will be described in conjunction with the modified structures. In the embodiment described above, the reference change gear ratio RO that is determined based on a constant predetermined change gear ratio in a specified operating condition of the vehicle is determined based on the minimum change gear ratio RT. However, it may be determined based on the maximum change gear ratio RL. It is also possible to use the revolution sensor 18 instead of the opening sensor 26 for detecting the operating conditions in which the minimum change gear ratio RT or the maximum change gear ratio RL.

In the embodiment described above, the driver is informed that the belt is ready to be replaced by the use of the display lamp 72. However, it is also possible to turn on the display lamp 72 at the moment when the belt is ready to be replaced, and to lower the output of the internal combustion engine E by ignition time control or the fuel injection control so that the driver further recognizes that the belt replacement is necessary.

The engine used in the embodiment described above was an internal combustion engine E. However, it may be a motor other than an internal combustion engine, and the vehicle may be a vehicle other than a motorcycle. In the embodiment described hereinabove, the automatic transmission has a minimum change gear ratio RT and the maximum change gear ratio RL as constant change gear ratios. However, the present invention can be applied to an automatic transmission having an intermediate change gear ratio, which is a constant change gear ratio of a value between both of the change gear ratios RT and RL.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A belt replacement timing annunciator for an automatic transmission mounted on a vehicle provided with an endless belt routed between a drive pulley connected to an output shaft of an engine and a driven pulley connected to an axle of a driving wheel, wherein a change gear ratio is shifted by changing radii of the endless belt according to operating conditions of the vehicle, said annunciator comprising:
    means for detecting specific operating conditions of the vehicle;
    means for detecting an actual change gear ratio of the automatic transmission;
    means for determining that the endless belt requires replacement, wherein said means for determining outputs a determination value if the actual change gear ratio exceeds a predetermined reference change gear ratio for the specific operating condition; and
    means for displaying the determination value of the means for determining.

2. The belt replacement timing annunciator according to claim 1, wherein said means for determining that the endless belt requires replacement ensures that said determination value is verifiable for a prescribed time period.

3. The belt replacement timing annunciator according to claim 2, further comprising measuring means for measuring an integrated mileage of the vehicle, wherein the means for determining that the endless belt requires replacement based upon the actual change gear ratio exceeding the reference change gear ratio or when the integrated mileage exceeds a reference mileage distance.

4. The belt replacement timing annunciator according to claim 3, wherein the reference change gear ratio is determined based on a minimum predetermined change gear ratio.

5. The belt replacement timing annunciator according to claim 3, wherein the reference change gear ratio is determined based on a maximum predetermined change gear ratio.

6. The belt replacement timing annunciator according to claim 2, wherein the reference change gear ratio is determined based on a minimum predetermined change gear ratio.

7. The belt replacement timing annunciator according to claim 2, wherein the reference change gear ratio is determined based on a maximum predetermined change gear ratio.

8. The belt replacement timing annunciator according to claim 1, further comprising measuring means for measuring an integrated mileage of the vehicle, wherein the means for determining that the endless belt requires replacement based upon the actual change gear ratio exceeding the reference change gear ratio or when the integrated mileage exceeds a reference mileage distance.

9. The belt replacement timing annunciator according to claim 1, wherein the reference change gear ratio is determined based on a minimum predetermined change gear ratio.

10. The belt replacement timing annunciator according to claim 1, wherein the reference change gear ratio is determined based on a maximum predetermined change gear ratio.

11. A belt replacement timing annunciator for an automatic transmission mounted on a vehicle provided with an endless belt routed between a drive pulley connected to an output shaft of an engine and a driven pulley connected to an axle of a driving wheel, wherein a change gear ratio is shifted by changing radii of the endless belt according to operating conditions of the vehicle, said annunciator comprising:
    an electronic control unit;
    a pair of revolution sensors providing a number of output shaft revolutions signals and a vehicle velocity signal;
    a throttle valve opening sensor for recording a degree of throttle valve opening signal;
    a microcomputer, said microcomputer processing said signals from said sensors, recording an integrated mileage value L, calculating an actual change gear ratio and comparing said actual obtain a change gear ratio determination value; change gear ratio to a predetermined reference change gear ratio to
    an LED display for indicating a belt replacement signal when said actual change gear ratio differs from said predetermined reference change gear ratio; and
    a resetting device for clearing a belt replacement signal based upon an operator input.

12. The belt replacement timing annunciator according to claim 11, further comprising a timer, said timer controlling an interval for determining said change gear ratio determination value.

13. The belt replacement timing annunciator according to claim 12, wherein the reference change gear ratio is determined based on a minimum predetermined change gear ratio.

14. The belt replacement timing annunciator according to claim 12, wherein the reference change gear ratio is determined based on a maximum predetermined change gear ratio.

15. The belt replacement timing annunciator according to claim 11, wherein the reference change gear ratio is determined based on a minimum predetermined change gear ratio.

16. The belt replacement timing annunciator according to claim 11, wherein said LED display indicates the belt replacement signal when said actual change gear ratio exceeds said predetermined reference change gear ratio.

* * * * *